(12) United States Patent
Pfaff (10) Patent No.: US 9,616,564 B2
(45) Date of Patent: Apr. 11, 2017

(54) EVENT-BASED REDUNDANCY ANGLE CONFIGURATION FOR ARTICULATED-ARM ROBOTS

(71) Applicant: KUKA Roboter GmbH, Augsburg (DE)

(72) Inventor: Bettina Pfaff, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/930,529

(22) Filed: Nov. 2, 2015

(65) Prior Publication Data

US 2016/0129588 A1 May 12, 2016

(30) Foreign Application Priority Data

Nov. 7, 2014 (DE) .................. 10 2014 222 809

(51) Int. Cl.
*G05B 19/04* (2006.01)
*G05B 19/18* (2006.01)
*B25J 9/06* (2006.01)
*B25J 9/16* (2006.01)
*B25J 9/00* (2006.01)

(52) U.S. Cl.
CPC .............. *B25J 9/06* (2013.01); *B25J 9/0081* (2013.01); *B25J 9/1633* (2013.01); *B25J 9/1643* (2013.01); *B25J 9/1666* (2013.01); *B25J 9/1674* (2013.01); *G05B 2219/39201* (2013.01); *Y10S 901/04* (2013.01)

(58) Field of Classification Search
CPC ..... B25J 9/16; B25J 9/06; B25J 9/0081; B25J 9/1633; B25J 9/1643; B25J 9/1666; B25J 9/1674; G05B 19/423; G05B 2219/39201; Y01S 901/04

USPC ....... 700/245, 250, 251, 252, 253, 254, 255, 700/256, 257, 260, 261, 262
See application file for complete search history.

(56) References Cited

U.S. PATENT DOCUMENTS

| 4,986,724 | A | * | 1/1991 | Steinmetz | ................ B25J 9/046 414/729 |
| 5,297,238 | A | * | 3/1994 | Wang | ..................... B25J 9/1692 700/254 |
| 6,212,443 | B1 | | 4/2001 | Nagata et al. | |
| 8,855,815 | B2 | * | 10/2014 | Mizutani | .............. G05B 19/423 318/560 |

(Continued)

FOREIGN PATENT DOCUMENTS

| DE | 3606685 | 11/1988 |
| DE | 69622572 T2 | 4/2003 |

(Continued)

OTHER PUBLICATIONS

Examination Report from GPTO in DE Appl. No. 102014222809.3, dated May 11, 2015.

(Continued)

*Primary Examiner* — Jaime Figueroa (57) ABSTRACT

The invention relates to a method and a system for controlling a robot, which has at least one redundant degree of freedom. The method according to the invention prevents the robot from colliding with its surrounding environment and/or from getting into an inconvenient position as a result of its redundancy, and does so without causing any disadvantageous displacement of the tool center point.

11 Claims, 5 Drawing Sheets

(56) References Cited

U.S. PATENT DOCUMENTS

| | | | |
|---|---|---|---|
| 9,050,728 B2* | 6/2015 | Ban | B25J 9/1697 |
| 9,339,934 B2* | 5/2016 | Kogan | B25J 9/1656 |
| 2004/0093119 A1* | 5/2004 | Gunnarsson | B25J 9/1638 |
| | | | 700/245 |
| 2005/0131582 A1* | 6/2005 | Kazi | B25J 9/1697 |
| | | | 700/259 |
| 2009/0171505 A1 | 7/2009 | Okazaki | |
| 2010/0121478 A1* | 5/2010 | Jahn | G05B 19/404 |
| | | | 700/173 |
| 2010/0274388 A1* | 10/2010 | Hagenauer | B23K 11/25 |
| | | | 700/250 |
| 2010/0324735 A1* | 12/2010 | Regaard | B25J 9/1015 |
| | | | 700/259 |
| 2012/0185089 A1* | 7/2012 | Schreiber | B25J 9/1656 |
| | | | 700/250 |
| 2013/0037212 A1 | 2/2013 | Maischberger | |
| 2014/0229006 A1 | 8/2014 | Rumping et al. | |
| 2015/0032263 A1* | 1/2015 | Keyl | B25J 19/0004 |
| | | | 700/261 |
| 2015/0127151 A1* | 5/2015 | Riedel | B25J 9/1643 |
| | | | 700/250 |

FOREIGN PATENT DOCUMENTS

| | | |
|---|---|---|
| DE | 10 2007 059480 | 6/2009 |
| DE | 102011003506 | 8/2012 |
| DE | 102011106321 A1 | 1/2013 |
| WO | 2014/043702 | 3/2014 |

OTHER PUBLICATIONS

The English translation of the Chinese Office Action, mailed on Oct. 11, 2016, in the related Chinese Patent Appl. No. 201510738679.9.
The extended European Search Report, mailed on Jun. 17, 2016, in the related European Patent Appl. No. 15193165.6.

* cited by examiner

EVENT-BASED REDUNDANCY ANGLE CONFIGURATION FOR ARTICULATED-ARM ROBOTS

This application claims the benefit of priority under 35 §119(a) to German Patent Application No. 10 2014 222 809.3, filed on Nov. 7, 2014.

1. TECHNICAL FIELD

The present invention relates generally to a method for controlling a manipulator, in particular a hand-guided multi-axle articulated-arm robot, which has at least one redundant degree of freedom.

2. TECHNICAL BACKGROUND

Manipulators, in particular manipulators such as industrial robots, are used for various work processes in, for example, assembly or production in industrial environments. An industrial robot is an automatically controlled, freely programmable manipulator, which can be programmed in three or more axes. Industrial robots can be mobile or can be employed at a fixed location.

An articulated-arm robot, or jointed-arm robot, is a three-dimensionally mobile industrial robot, which is made up of several pivot joints. Normally, the pivot joints are connected to arm links, and each pivot joint features a joint axis. Articulated-arm robots are often equipped with six joints, in order to represent each of the six possible Cartesian degrees of freedom with one joint axis if this is possible. If a robot has six or fewer degrees of freedom, the position and orientation of the individual arm links is usually clearly defined by the position of the Tool Center Point (TCP).

If, however, the manipulator has more than six degrees of freedom or more than six joint axes, the seventh axis and every additional axis represent an over-determination. With a stationary TCP, various configurations of the joints and arm links are therefore possible. The manipulator thus has additional degrees of freedom, which are considered to be redundant. Generally, redundant manipulators have more joint axes than Cartesian degrees of freedom. A manipulator having a redundant seventh axis advantageously features increased flexibility, because with a fixed TCP—i.e. when the position and orientation of the TCP in space remains unchanged—the manipulator can reach several poses. This increased flexibility, or flexible capability, can be made use of for example, for collision avoidance.

Nevertheless, a redundant manipulator can also reach undesirable poses. It is thus easy to imagine that, in the case of an articulated-arm robot having 7 joints, the redundant joint (usually the center joint or elbow joint) can realize a redundant movement. Thus this joint can, for example, due to a redundancy in an elbow joint of an articulated-arm robot, undesirably drop downwards or be displaced and prevent the execution of subsequent movements. This can occur in particular when the articulated-arm robot is being hand-guided in the force-compensated mode, in which, for example, the effect of gravity on the links of the manipulator is compensated for. Here, an elbow joint can, for example, drift into an inconvenient area and collide with its surrounding environment or with the operator. Furthermore, the articulated-arm robot can get into an unfavorable pose when being hand-guided, such that the robot can only be moved onwards by manual reorientation of the elbow angle. The operator must then disadvantageously use both hands to control the robot.

In the patent document WO 2014/043702 A1, published in the English language on Mar. 20, 2104 and hereby incorporated by reference in its entirety herein, a system and a method are described to limit the movement of a robot which has redundant degrees of freedom. In order to prevent the pose of a robot from changing in an uncontrolled manner when the robot is hand-guided in the force-compensated mode, it is proposed to limit the redundant degrees of freedom of the robot by applying restricting forces or torques internally to the joints, in order to force the robot arm into a preferred configuration. As a consequence, the mobility of the robot is generally limited.

Furthermore, it is known in the prior art to downgrade a redundant robot to a 6-axis kinematic system, for example by fixing or blocking the elbow joint. In addition, a reorientation of the elbow joint in the case of a fixed TCP (corresponds to a null space motion) for redundant robots is known. Nevertheless, no method exists to optimally control the behavior of an elbow joint while the robot is, in particular, hand-guided in the force-compensated mode.

In view of the above-described prior art, the objective of the present invention is to provide a method and a system which allow optimization of the behavior of the elbow joint of a manipulator in the hand-guided mode. In particular, this should prevent the elbow joint from moving freely, or from moving or being displaced beyond a certain position or beyond a certain angle, for example. Another objective of the present invention is to prevent a drifting of the pose of a redundant manipulator into an undesirable position. The objective is achieved with the method according to Claim 1 and the manipulator system according to Claim 10.

3. CONTENT OF THE INVENTION

The method according to the invention relates to the control of a hand-guided multi-axle manipulator, for example, of an articulated-arm robot, the axes of which are equipped with torque sensors to register the torques acting on the axes. Due to its axes assembly, the manipulator has at least one redundant degree of freedom. The manipulator can be operated in at least one of its degrees of freedom by means of a compliance control, which allows a force- and/or torque-controlled operation. Such a compliance control can occur in particular by means of an impedance control, an admittance control, a position control or a torque control. Usually, the hand-guided manipulator is guided directly at the end effector, i.e. at the tool center point, and the operator concentrates only on the movement of the end effector.

The present invention allows the manipulator to move freely within a defined range, without limiting the operating options. According to the method, a range is defined for at least one joint of the multi-axle manipulator, in which range this joint can move freely according to the overall movement of the manipulator. In other words, when the manipulator changes its pose in accordance with the hand-guided movement, the joint can move in a range defined for this joint, without having to exert influence on this movement. Preferably, the range is defined such that a collision of the corresponding joint with the surrounding environment and/or the operator is avoided. Alternatively or additionally, the range can also be defined such that a movement of the corresponding joint into an inconvenient position is avoided.

In another step, it is determined whether a joint has reached a limit of the range defined for the joint. It is therefore determined whether, as a result of the hand-guided movement, a joint has reached a limit of the range which was defined for this joint.

In a subsequent step, the movement of the manipulator is adjusted if it has been determined that the joint has reached the limit of the range defined for the joint. The movement is adjusted such that a movement of the joint through the limit is counteracted, without the tool center point of the manipulator being displaced as a result of this counteraction. In particular, when a joint has reached a limit for a range in which it can move freely, the movement of the manipulator is adjusted such that the joint cannot move freely through the limit of the range. Making use of the redundant degree of freedom, the movement is adjusted such that the tool center point of the manipulator advantageously (i.e. without significant disruption of the work process) is not displaced, i.e. is not shifted or twisted or tilted. The position and orientation of the TCP in space thus remains essentially unchanged.

If a joint leaves a range defined specifically for the joint, an appropriate adjustment of the movement of the manipulator prevents a joint from moving away from a range defined for the joint and the manipulator from occupying an inconvenient pose as a result. The present invention relates, in particular, to manipulators that have several axes, with preferably all the axes, and at least the axes of significance for the operation, being able to be force-control or torque-control operated. Advantageously, the movement of the manipulator is adjusted by the method according to the invention only when a joint has reached a range limit defined for the joint so that, otherwise, the full flexibility of the redundant robot can be exploited.

This method advantageously allows the movement of the manipulator to be limited only when a joint, such as an elbow joint for example, has reached a defined range limit. This allows all degrees of freedom of the manipulator and the resulting high level of flexibility to be taken advantage of. This prevents the operator having to use both hands to prevent the manipulator from reaching inconvenient poses.

In a generally preferable way, the adjustment of the movement of the manipulator in response to the determination (the detection) that a joint has reached a limit of the range defined for the joint comprises a change in the stiffness of the joints of the manipulator and/or an application of a force. The person skilled in the art will understand that a change in the stiffness causes a change in the cushioning of a joint. Such an adjustment of the stiffness takes place by means of appropriate control of the corresponding motors, so that the movement resistance is changed. Alternatively, the null-space stiffness can also be increased for the joint. Through the application of a force, a movement of the joint is counteracted, so that the joint cannot slide or fall out of the permitted range into a prohibited zone. Preferably, the adjustment of the movement pertains to precisely that joint, which has reached a limit of the range defined for the joint. It is also preferable that the adjustment of the movement does not pertain to any of the other joints.

The manipulator preferably has at least six axes A1-A6, and even more preferably, at least seven axes A1-A7. Through the adjustment of the movement, the stiffness of the redundant joints of the axes A3 and/or A4 is changed, with the joints of the axes A3 and/or A4 preferably defining an elbow joint of the manipulator.

In a generally preferable way, the adjustment of the movement comprises a position change of the joint and the adjoining arms, which has reached the limit of the range defined for the joint. The actual position of the corresponding joint is thus actively commanded, and thus any collision of the joint with the surrounding environment is prevented. This position change can take place as an alternative to or in addition to the above-described response options for the joint which has reached a limit.

Preferably, the determination (the detection) of whether a joint of the manipulator is located outside of a working range defined for the joint comprises an identification of rising and/or falling edges. In the case of signals, the signal edges are the transitions between the signal states high (H) and low (L), and these are referred to as rising and falling edges. It is also preferable that the determination is carried out while the manipulator is hand-guided in the force-compensated mode.

The pose of a redundant manipulator is corrected, or the movement of individual joints is adjusted, by means of the method according to the invention when a range defined for an individual joint is left. Making use of the redundant degree of freedom, this process occurs in such a way that the tool center point of the manipulator is not displaced or moved as a result of the adjustment, or at least not to such an extent that the work process is disrupted. Consequently, the operator can continue working undisturbed, without monitoring the pose of the manipulator and without having to interrupt his work due to the described movement adjustment.

The manipulator system according to the invention— comprising a hand-guided multi-axle manipulator, in particular an articulated-arm robot, the axes of which are equipped with torque sensors to register the torques acting on the axes, wherein the manipulator has at least one redundant degree of freedom and has a tool center point—is equipped with a control device, which is configured to execute the method according to the invention, so as to be able to implement the steps of the method described herein.

4. EXEMPLARY EMBODIMENTS

The invention is described in greater detail below with reference to the accompanying figures, in which.

Figure 1:
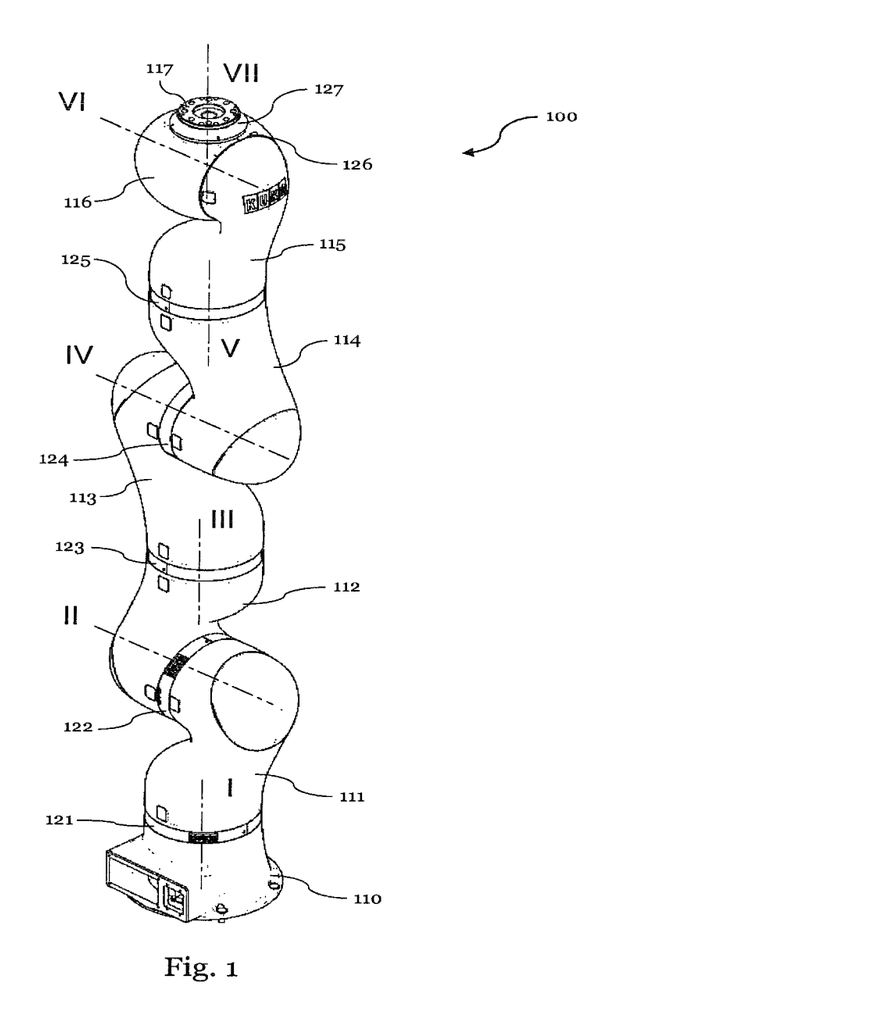
FIG. 1 shows a multi-link articulated-arm robot having force-controlled axes I-VII.

FIG. 1 shows a multi-link manipulator, specifically an articulated-arm robot 100 in an extended pose and illustrates the design of the links or arms 111, 112, 113, 114, 115, 116 and of the driven and controllable or adjustable axes I-VII. The robot 100, depicted by way of example, is a lightweight robot of the KUKA LBR III type, which is installed in a stationary manner by means of a base 110. An end effector can be mounted on the hand flange 117 of the robot 100. The person skilled in the art will understand that an end effector also provides a tool center point. The individual elements 110, 111, 112, 113, 114, 115, 116, 117 of the depicted robot 100 are connected to one another by means of joints 121, 122, 123, 124, 125, 126, 127, with the joints being able to move independently of one another. The depicted robot 100 has seven rotational axes I-VII. One of these axes is therefore to be considered redundant by comparison with a sufficiently deterministic 6 DOF system. While the axes I-III form the shoulder joint of the represented robot 100, and axes V-VII form a corresponding wrist joint, the axis IV and the corresponding joint 124 can be considered to be the redundant joint, or elbow joint, of the robot 100.

Figure 2:
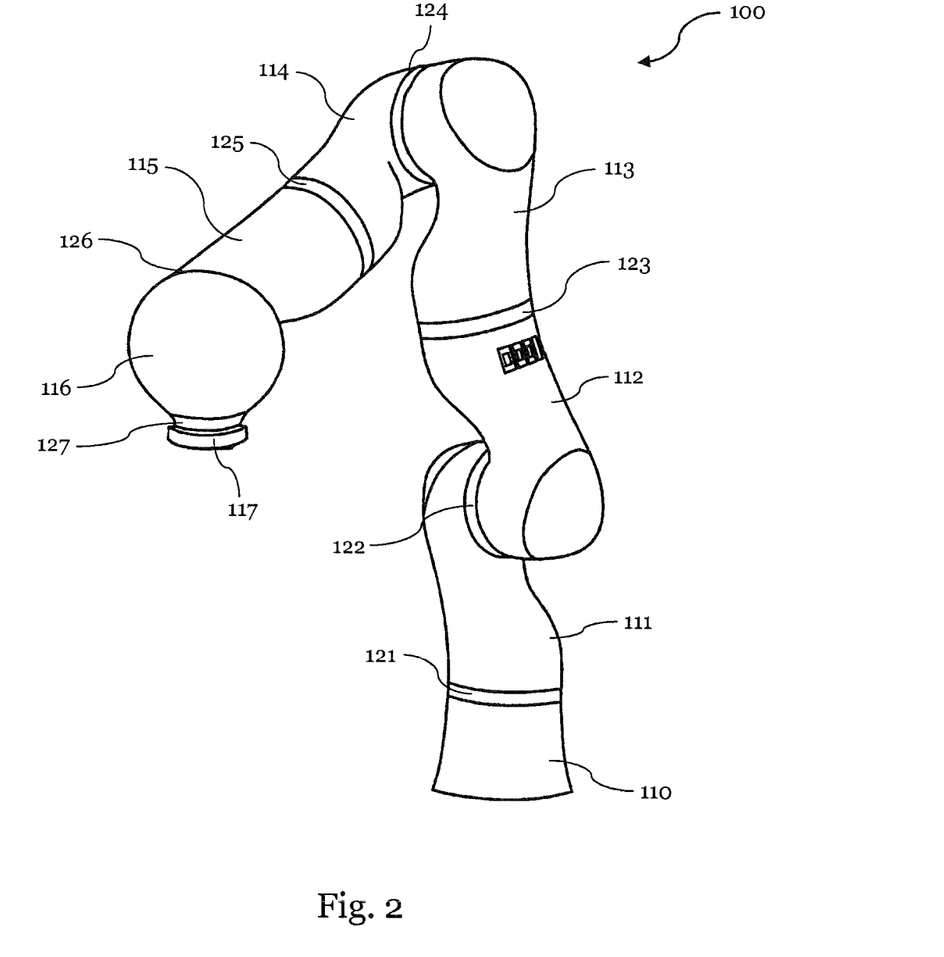
FIG. 2 shows the robot of FIG. 11 in another pose.

FIG. 2 shows the robot 100 in another pose. By contrast to the pose depicted in FIG. 1, the elbow joint is now clearly bent, and represents the highest point of the robot 100. If an operator guides the robot 100 directly at the hand flange 117 itself, the robot 100 can respond in accordance with the hand-guided movement and follow the guidance. Because of the redundant axis it is possible, however, for the elbow joint 124 to tilt downwards, where a collision could take place between it and the operator. Such a redundant movement of the elbow joint, dependent on the upstream and downstream joint, can be described by a change in the so-called elbow angle. The method according to the invention makes it possible to avoid a disadvantageous change in the elbow angle. The person skilled in the art will understand that the method according to the invention can also be applied to other angles or joints, in particular in the case of an articulated-arm robot having more than seven axes.

Figure 3:
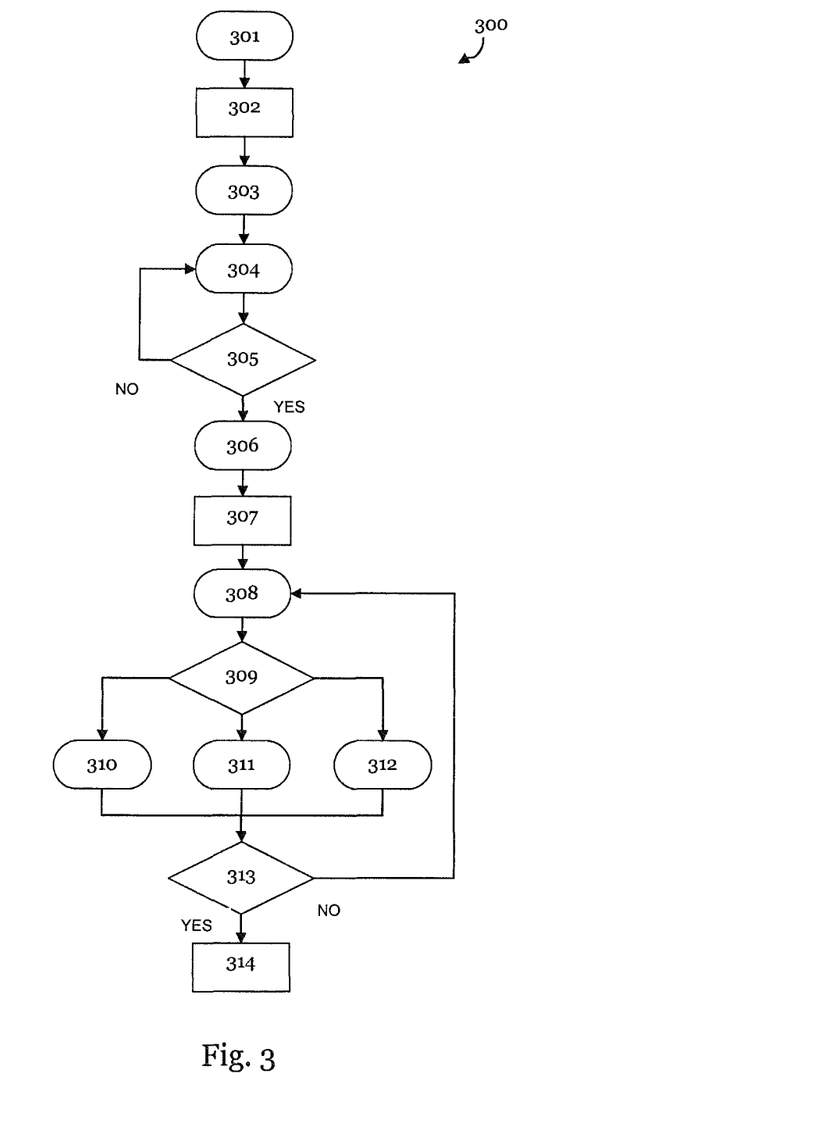
FIG. 3 shows a flowchart, which depicts, in a schematic and exemplary manner, the sequence of the method according to the invention.

FIG. 3 shows a sequence diagram for carrying out a method 300 according to the invention. It makes reference, by way of example, to the elbow joint of a manipulator, which is to be controlled using the method in such a way that any movement of the joint outside of a defined range is counteracted, without the tool center point being moved as the result of a corresponding response. The method begins in step 301, in which the range (or the working range or working space) for the elbow joint is defined. In step 302, the manipulator has a pose at which the elbow joint of the manipulator is located in the range defined for the joint. In step 303 a stipulation can be formulated, for example, falling short of a spatial distancing of the elbow joint from the working space limit.

In step 304 the elbow joint of the manipulator approaches the limit of the defined range. This approximation takes place in response to the hand-guided movement of the manipulator. In the decision 305 it is checked whether the elbow joint has reached a limit of the range defined for the joint. Alternatively, in the decision 305 it can be checked whether the stipulation defined in step 303 has been satisfied.

If the result of the check 305 is positive, in step 306 a time-synchronous message with system information is provided. This system information can contain, among other things, the current position of the manipulator and of the elbow or the current elbow angle, as well as the forces and/or torques in the individual joints.

At the point in time 307, the elbow joint of the manipulator is located at the limit of the defined working range. In step 308, a response strategy is executed. This response strategy can, according to the decision 309, consist of one or more responses and depend on the system information provided. Thus, in step 310, the stiffness of the elbow joint can be increased. In other words, the elbow angle is made more rigid in order to prevent another drop in the elbow angle. In the torque control, the stiffness of the elbow joint can be increased. In step 311, a direction-oriented application of force to the elbow joint can take place. The application of a force pulse is realized in a time-synchronous manner, so that the elbow joint is shifted back into the permitted range. Alternatively, in step 312, the Cartesian position of the elbow joint itself can be commanded afresh, in order to reach a desired position. This variant is advantageous, in particular when the monitoring of the elbow is intended to prevent the manipulator from colliding with its surrounding environment.

In the decision 313 it is determined whether the joint of the manipulator is located in the defined range. At the time 314, the elbow joint of the manipulator is again located inside the range defined for the joint.

The person skilled in the art will understand that the three described response strategies 310, 311 and 312 represent exemplary responses only, and other possible response strategies can be selected. The programmer or operator can decide for himself/herself which response strategy is to be applied and whether several strategies should be combined.

Preferably, the operator can, by pressing a corresponding button on a media flange or tool, produce a manipulator response. Consequently, the adjustment of the movement of the manipulator can be manually triggered, and the adjustment itself then occurs automatically. For example, the operator can manually trigger an adjustment of the movement of the manipulator, whereupon the manipulator automatically responds accordingly, so that a movement of a joint through a limit of the range defined for the joint is counteracted, and without the tool center point of the manipulator being displaced as a result of the counteraction.

Figure 4:
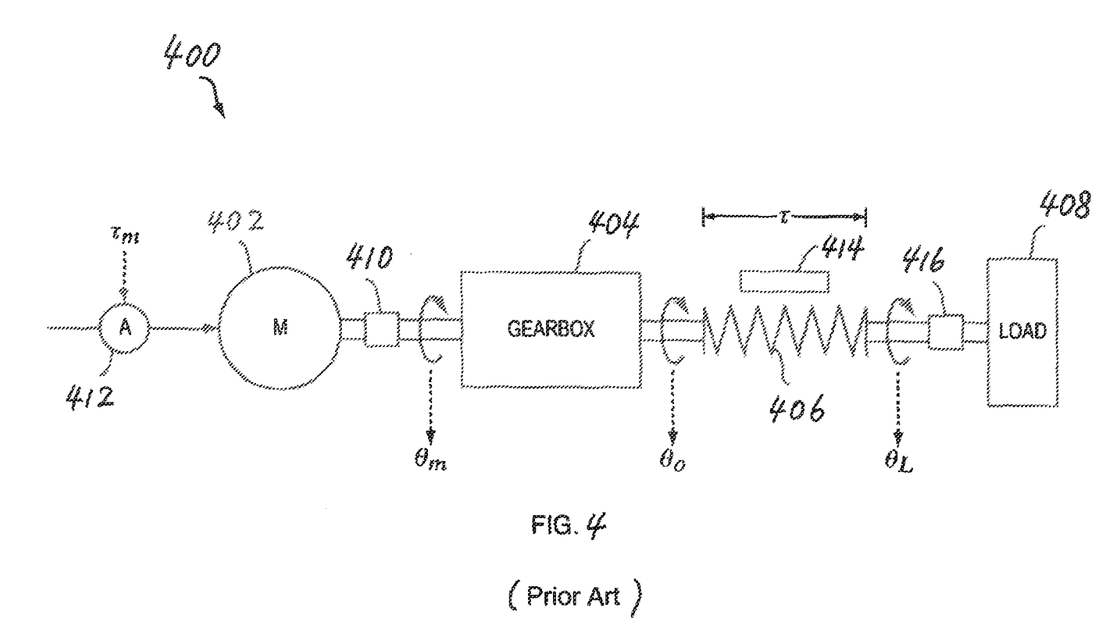
FIG. 4 is a schematic drawing of a series elastic actuator that may be employed at the joints of a multi-link articulated-arm robot in accordance with the invention.

In the patent document WO 2014/043702 A1 above-noted as incorporated by reference in its entirety herein, series elastic actuators are disclosed that may be used at the robot joints 121, 122, 123, 124, 125, 126, 127 of the robot 100 in accordance with the present invention. Series elastic actuators are described in detail in, for example, U.S. Pat. No. 5,650,704, issued on Jul. 22, 1997, the entire disclosure of which is hereby incorporated by reference in the patent document WO 2014/043702 A1. As schematically illustrated in FIG. 4, a series elastic actuator 400 for a joint generally includes a motor 402, a gearbox 404, and a series elastic element 406 through which a load 408 may be transmitted, such as a spring (e.g., a torsional spring in case of a rotary joint) connected in series between the gearbox 404 and load 408. The load 408 at a particular joint 121, 122, 123, 124, 125, 126, 127 includes all robot components (e.g., links 111, 112, 113, 114, 115, 116; other joints 121, 122, 123, 124, 125, 126, 127) distal to that joint as well as, during performance of the robot's regular tasks, any object the robot carries with the flange 117—in other words, everything that contributes to the external torque applied to the joint 121, 122, 123, 124, 125, 126, 127. To support the load 408, the motor 402 is driven by an adequate electrical current, as computed by the control device 500.

The series elastic actuator 400 is typically equipped with one or more sensors for monitoring the state of the joint, such a position sensor or encoder 410 (e.g., a set of Hall-effect sensors and associated counting circuitry) associated with the motor 402, an Ampere-meter 412 measuring a current supplied to the motor 402, a spring deflection sensor 414 measuring the angle that the series-elastic element 406 deflects, and an output position sensor 416 (e.g., a magnetic angle encoder) measuring the output angle of the joint. The electrical current driving the motor 402 may for example be set by the control device 500 of FIG. 5, taking into account measurements of the angular motor position, the spring torque, and the output angle (i.e., the angular position of the load). The sensor measurements may be monitored for mutual consistency (e.g., based on a model of joint operation) to ensure that the robot 100 operates as intended.

Figure 5:
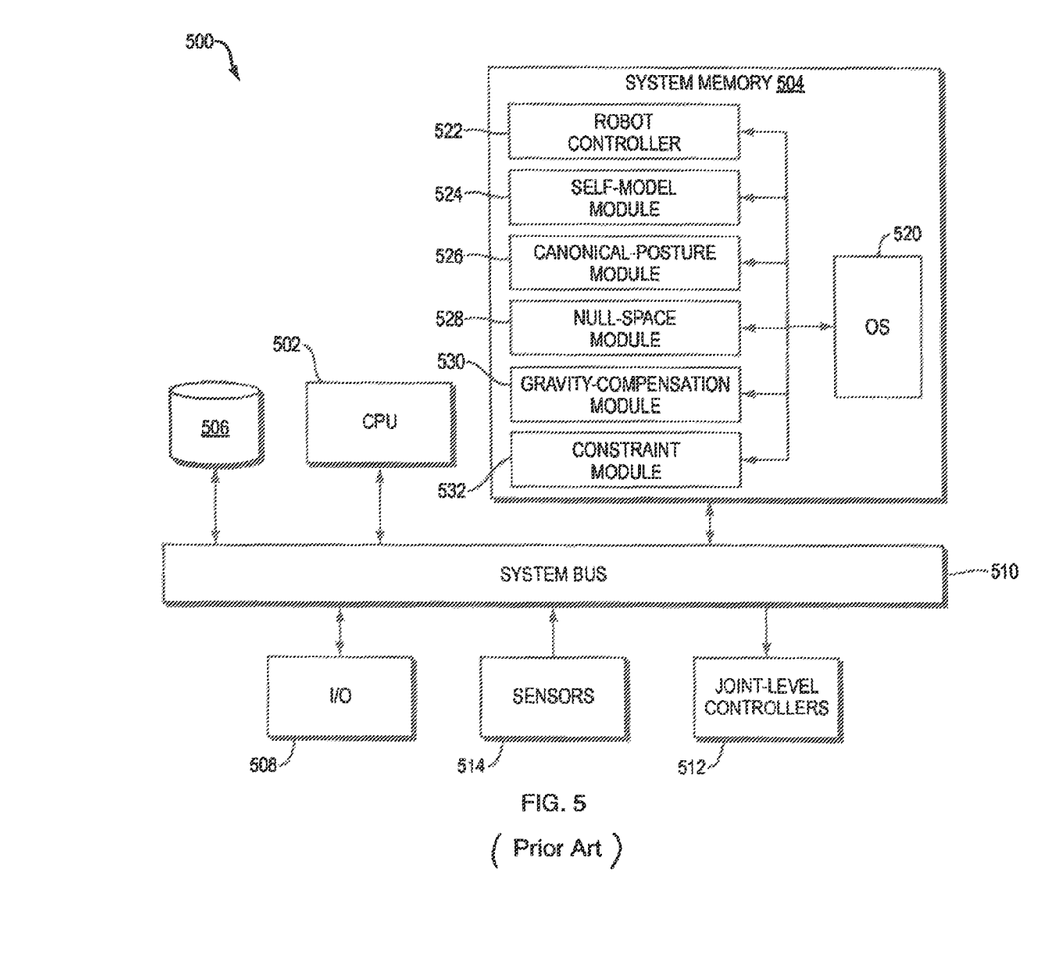
FIG. 5 is a block diagram schematically illustrating a control device for computing constraining forces or torques in accordance with the invention.

Patent document WO 2014/043702 A1 further discloses a general purpose computer 500 that may be used as a control device in accordance with the present invention. The computer 500 may include a processor (CPU) 502 and associated system memory 504 (e.g., random access memory (RAM)), one or more non-volatile storage devices 506 (e.g., one or more hard drives, CD-ROMs, DVDs, magnetic tapes, USB memory keys, or other conventional data storage media), a user interface 508 with input/output (I/O) devices (e.g., screen, keyboard, and mouse), and a system bus 510 that facilitates communication between these components. The system bus 510 also connects the computer with the joint-level controllers 512 and robot sensors 514 that serve to monitor the positions of and forces applied at the joints (e.g., the sensors previously described in the series elastic actuators of FIG. 4).

The system memory 504 stores processor-executable instructions organized into modules, including an operating system (OS) 520 that governs file access, memory allocation, and other low-level functionality, as well as one or more high-level applications for implementing the methods described herein. The high-level applications may include, e.g., a module implementing the robot controller 522 (which sends commands to external joint-level controllers 512), a module 524 for maintaining the robot's self-model based on input from the sensors 514, a module 526 for recording or otherwise defining the canonical posture(s), a module 528 for determining the robot's current null space, a module 530 for computing the torque terms required to compensate for gravity, and a module 532 for modeling constraints on the redundant degrees of freedom, e.g., by means of virtual springs pulling the manipulator towards the canonical posture, and computing the additional torque terms implementing these constraints. The modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages. Of course, the instructions implementing the various functions may be grouped and organized in many different ways; the depicted organization into a few discrete modules is intended to be exemplary only.

The person skilled in the art will understand that different modifications of the described embodiments are possible because, in particular, the corresponding manipulator is capable of variation in the number and design of its links and also of its driven axes. For example, the manipulator can have any number and combination of rotational and/or translational axes, so that the manipulator has at least one redundant degree of freedom. Therefore, the invention claimed herein is not limited to the described embodiments, but may be otherwise variously embodied within the scope of the claims listed infra.

REFERENCE NUMERALS LIST

100 Robot
110 Robot base
111, 112, 113, 114, 115, 116 Connecting link
117 Hand flange
121, 122, 123, 124, 125, 126, 127 Joint
400 Series elastic actuator
402 Motor
404 Gearbox
406 Series elastic element
408 Load
410 Position sensor or encoder
412 Ampere-meter
414 Spring deflection sensor
416 Output position sensor
500 Control device
502 Processor
504 System memory
506 Non-volatile storage
508 User interface
510 System bus
512 Joint-level controllers
514 Sensors
520 Operating system
522 Robot controller
524 Self-model module
526 Canonical-posture module
528 Null-space module
530 Gravity-compensation module
532 Constraint module
I, II, III, IV, V, VI, VII Axes

The invention claimed is:

1. A method for controlling a hand-guided multi-axle manipulator, in particular an articulated-arm robot, the axes of which are equipped with sensors to register the torques acting on the axes and the positions of a plurality of joints of the multi-axle manipulator, wherein the manipulator has at least one redundant degree of freedom, and wherein the manipulator has a tool center point, which includes the following method steps performed by a control device:
 defining, for at least one of the plurality of joints of the manipulator, a range in which the joint of the manipulator can move freely according to the overall movement of the manipulator;
 determining according to a position registered by one of the sensors whether the joint has reached a limit of the range defined for the joint as a tool center point of the manipulator is guided by an operator; and
 adjusting movement of the manipulator in response to the determination that the joint has reached the limit of the range defined for the joint, so that a movement of the joint through the limit is counteracted, without the tool center point of the robot being displaced as a result of the counteraction.

2. The method according to claim 1, wherein the adjustment of the movement comprises at least one of a change in the stiffness of the joints of the manipulator or an application of a force.

3. The method according to claim 2, wherein the adjustment of the movement pertains to the one joint which has reached a limit of the range defined for the joint.

4. The method according to claim 3, wherein the adjustment of the movement does not pertain to any of the other joints.

5. The method according to claim 1, wherein the manipulator has at least six axes A1 to A6 and the adjustment of the movement is a change in the stiffness of the joints of the axes A3 or A4 of the manipulator, wherein the joints of the axes A3 or A4—define an elbow joint of the manipulator.

6. The method according to claim 1, wherein the adjustment of the movement comprises a redirection of the movement of the one joint, which has reached the limit of the range defined for the joint.

7. The method according to claim 1, wherein the determination of whether the one joint of the manipulator is located outside of the range defined for the joint comprises an identification of rising and/or falling edges of signals produced by the one sensor.

8. The method according to claim 1, wherein the determination is carried out while the manipulator is guided by the operator in a force-compensated mode.

9. The method according to claim 1, wherein the adjustment of the movement of the manipulator can be manually triggered, and the adjustment then occurs automatically.

10. A manipulator system, comprising:
a hand-guided multi-axle manipulator the axes of which are equipped with sensors to register the torques acting on the axes and the positions of a plurality of joints of the multi-axle manipulator, wherein the manipulator has at least one redundant degree of freedom and wherein the manipulator has a tool center point, and
a control device,
wherein the control device is configured to:
  a) define, for at least one of the plurality of joints of the manipulator, a range in which the joint of the manipulator can move freely according to the overall movement of the manipulator;
  b) determine according to a position registered by one of the sensors whether the joint has reached a limit of the range defined for the joint as a tool center point of the manipulator is guided by an operator; and
  c) adjust a movement of the manipulator in response to the determination that the joint has reached the limit of the range defined for the joint, so that a movement of the joint through the limit is counteracted, without the tool center point of the robot being displaced as a result of the counteraction.

11. The manipulator system of claim 10, wherein the hand-guided multi-axle manipulator is an articulated arm robot.

* * * * *